United States Patent [19]

Sivin et al.

[11] 4,237,956
[45] Dec. 9, 1980

[54] SOLAR HEATED DOOR

[75] Inventors: Bernard J. Sivin; John J. Luby, both of Dallas, Tex.

[73] Assignee: Overhead Door Corporation, Dallas, Tex.

[21] Appl. No.: 941,457

[22] Filed: Sep. 12, 1978

[51] Int. Cl.² .............................................. E06B 9/08
[52] U.S. Cl. ..................... 160/120; 160/25; 160/133; 160/241
[58] Field of Search ............... 160/120, 133, 98, 99, 160/100, 25, 241, 303

[56] References Cited
U.S. PATENT DOCUMENTS

| | | | |
|---|---|---|---|
| 1,726,854 | 9/1929 | Mumford | 160/120 |
| 2,871,923 | 2/1959 | Kroger | 160/100 |
| 3,236,290 | 2/1966 | Lueder | 160/309 |

*Primary Examiner*—Peter M. Caun
*Attorney, Agent, or Firm*—Blanchard, Flynn, Thiel, Boutell & Tanis

[57] ABSTRACT

Solar heat is utilized for heating a door structure whereby to minimize the escape of heat from within the building or other structure upon which such door is used. The door comprises at least two flexible sheets, one thereof constituting the principal door structure and the other constituting the heat generating means. The second sheet is spaced outwardly of the first sheet and parallel therewith. Both of the sheets are supported in any convenient manner such as on rollers either or both of which are preferably spring loaded for counterbalancing purposes. The inner sheet is normally opaque to normal light and heat radiation, such as by being made of steel, and constitutes the principal door. The other sheet is in one embodiment transparent to short-wave electromagnetic radiation but opaque to long-wave electromagnetic radiation and may preferably constitute a piece of transparent flexible plastics material. Sun or other light rays will pass through the outer sheet, warm the inner door and trap the thereby generated heat within the space between the two sheets, i.e. provide a greenhouse effect. In another embodiment, the outer sheet is heat absorbtive (as black) and is warmed by the sun's rays and warms the inner door. Such warming of said principal door destroys, or at least diminishes, the heat gradient through said door and thereby prevents or diminishes the escape of heat from within the building.

7 Claims, 7 Drawing Figures

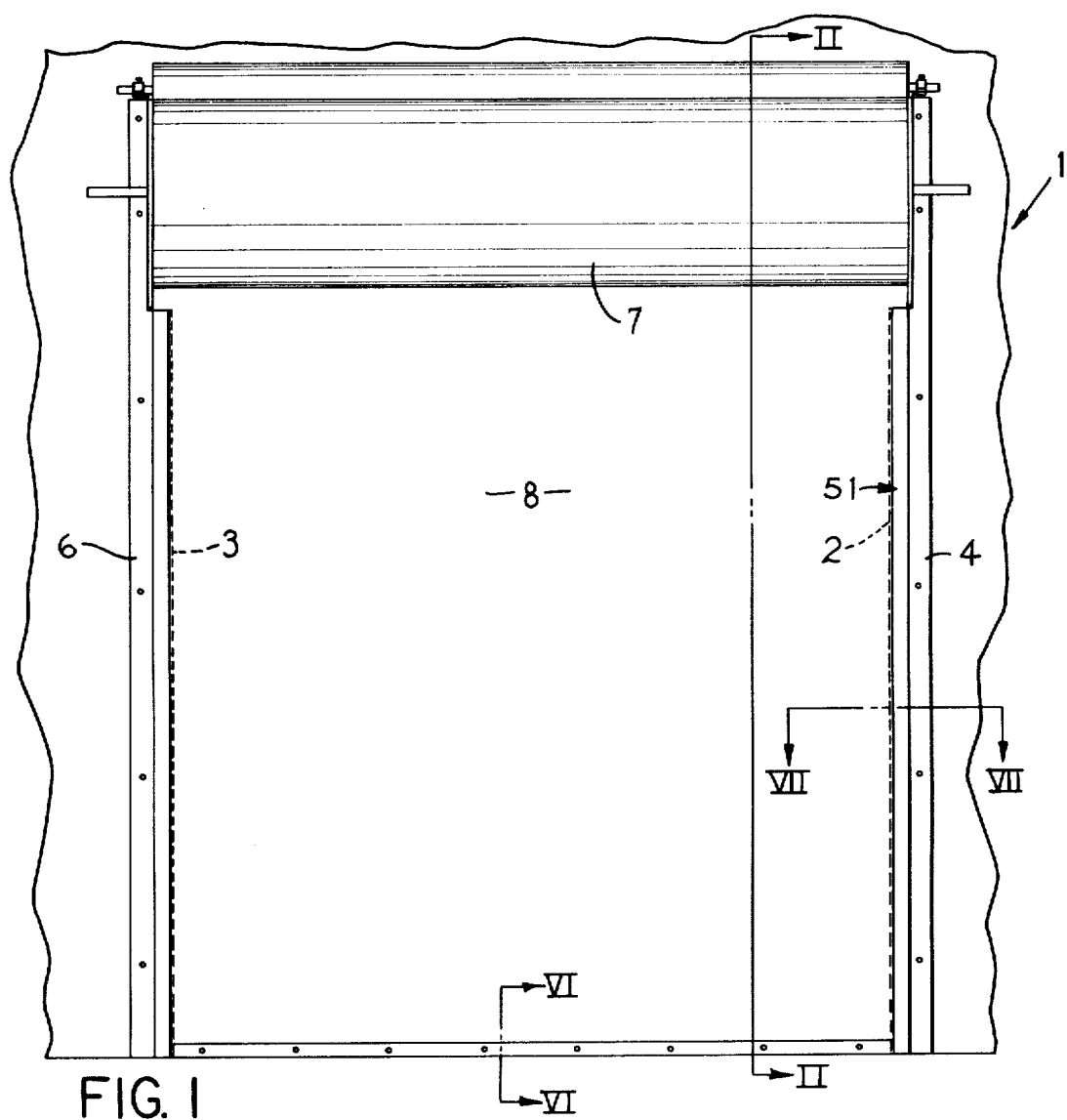
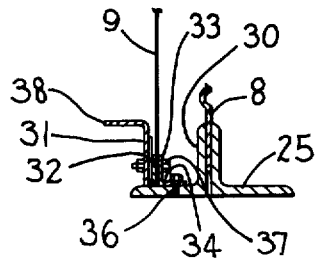
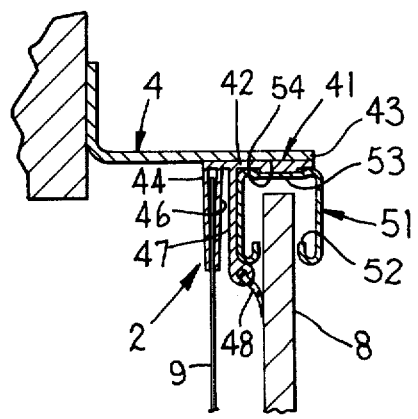

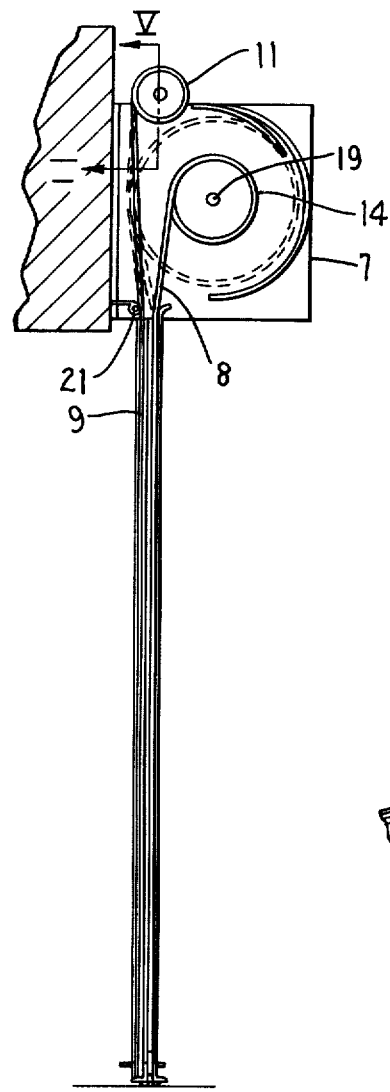
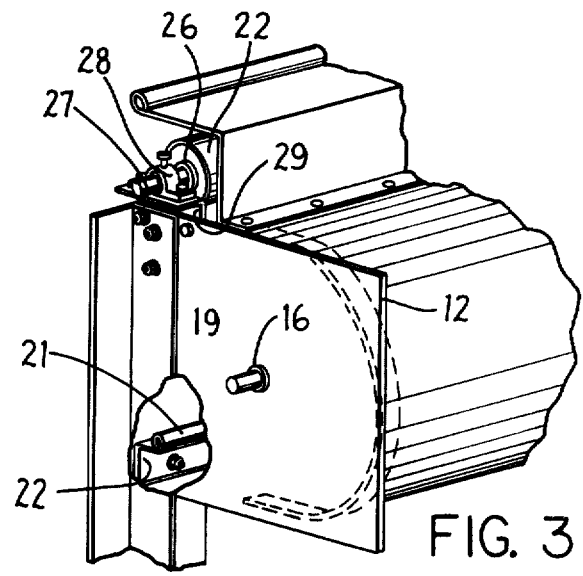
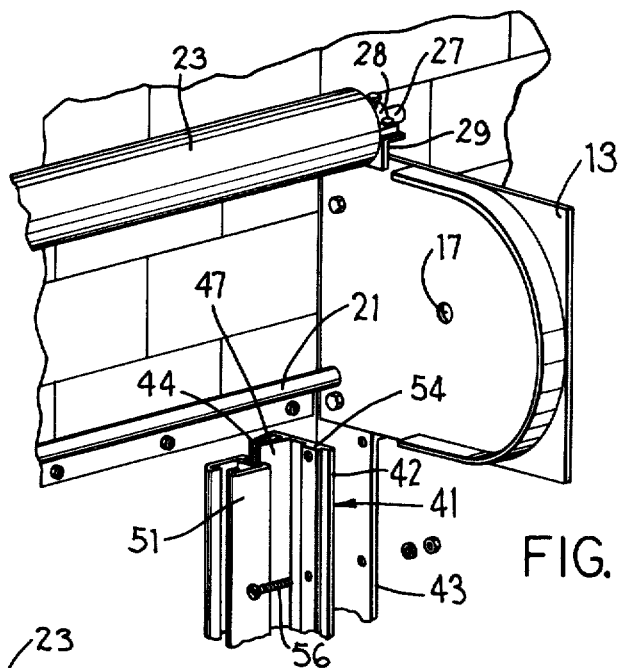
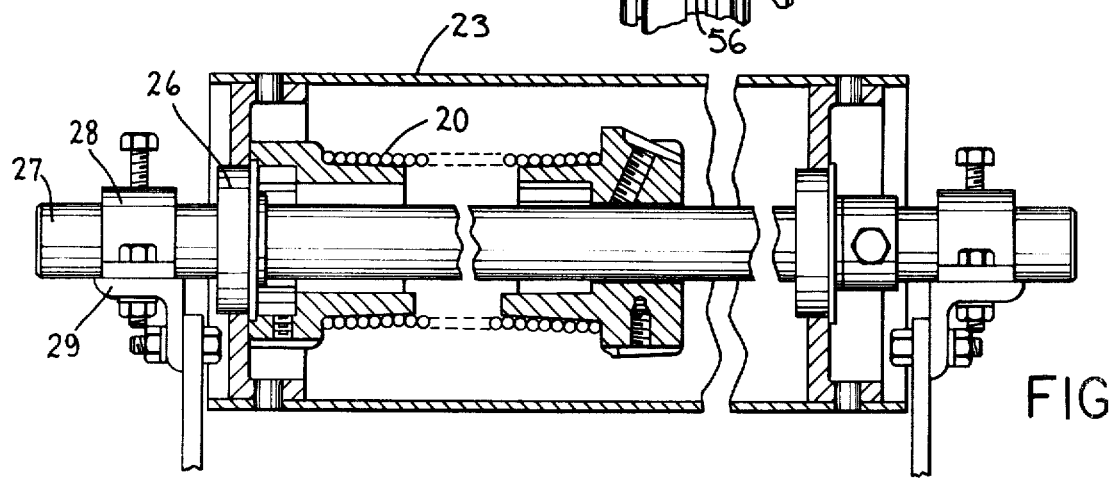

SOLAR HEATED DOOR

FIELD OF THE INVENTION

The invention relates to doors, especially for buildings, and particularly to a door comprising a pair of spaced parallel sheets, said sheets being arranged for providing a heat generating and retaining effect to utilize solar energy for generating and trapping heat between said sheets and thereby minimizing the escape of heat from within the building with which such door is used.

BACKGROUND OF THE INVENTION

It has long been recognized that heat losses from a building are usually the most severe per unit area of external surface thereof through the windows and through the doors. Such heat losses have long been substantially reduced by use of storm windows or storm doors in connection with the windows and small doors of such building but the problem has continued to exist with respect to large doors. Where only a few doors have existed in a building, the heat losses therethrough have normally been tolerated. However, in buildings such as warehouses, aircraft hangars, garages, boat storage buildings and others of similar nature where the doors are large, they have often been the source of heat losses which have been significant. These losses have been particularly severe where, as is often the case, such doors are made of steel or other materials of good heat transmitting capabilities. In the case of sliding doors, such heat loss has sometimes been reduced by providing doors having multiple, as two, spaced panels and in some cases the space between such panels has been filled with insulation. However, where such doors have been of the roll type, and made of hingedly interlocking parallel strips of steel, such techniques have not been available. Some attempts have been made to spray insulation onto the slats of roll-type doors but the structural requirements of such doors have prevented good results. Hence, with roll-type doors, the heat losses have been severe.

Accordingly, the objects of the invention include:

1. To provide a door construction for utilizing solar radiation to minimize heat losses from within the building through such door.

2. To provide a door construction, as aforesaid, which is particularly adaptable to flexible roll-type steel doors.

3. To provide a door construction, as aforesaid, which will not materially change the general construction of the steel portion of the door and thereby not alter presently known and accepted specifications for roll-type steel doors.

4. To provide a door construction, as aforesaid, which will not materially, if at all, change the manner of operation of the door from that presently familiar for roll-type steel doors.

5. To provide a door construction, as aforesaid, which will not add materially to the cost of presently known roll-type steel doors.

6. To provide a door construction, as aforesaid, which will be durable and consequently long lasting but which if replacement is required, such replacement can be accomplished easily and quickly.

7. To provide a door construction, as aforesaid, which is easily and effectively sealed against passage of other than inconsequential amounts of air, if any, past such door into or out from the building with which such door is used.

8. To provide a door construction, as aforesaid, wherein the heat protective means can be readily applied to an existing roll-type door unit if desired and without the necessity for applying weather stripping to the original door.

Other objects and purposes of the invention will be apparent to persons acquainted with apparatus of this general type upon reading the following specification and inspection of the accompanying drawings.

BRIEF DESCRIPTION OF THE DRAWINGS

In the drawings:

FIG. 1 is a front elevational view of a door embodying the invention taken from the inside of the building with which said door is used.

FIG. 2 is a section taken on the line II—II of FIG. 1.

FIG. 3 is an oblique, broken view of the upper end of said door.

FIG. 4 is an oblique, broken view of said door from a different angle.

FIG. 5 is a broken, somewhat schematic, sectional view taken on the line V—V of FIG. 2.

FIG. 6 is a sectional view taken on the line VI—VI of FIG. 1.

FIG. 7 is a sectional view taken on the line VII—VII of FIG. 1.

SUMMARY OF THE INVENTION

Briefly, the invention consists of positioning a sheet of flexible plastics material is parallel and spaced relation to a roll-type steel door in such relationship as to be extendible therewith into closed relationship with respect to the building with which such door is used and openable therewith by a single motion, such as a single motion applied to the roll-type steel door. The upper end of said plastics sheet is fixed to a spring counterbalanced roll adjacent to the spring counterbalanced roll on which said steel door is wrapped. The spacing of the plastics sheet from the steel door provides a heat generating and retaining effect which under at least certain favorable conditions will warm said steel door and thereby minimize the escape of heat from within the building therethrough.

DETAILED DESCRIPTION

Turning now to the drawings and with initial reference to FIG. 1, there is shown a building opening, as a door opening, occupied by door structure 1. In this embodiment said door comprises horizontally arranged, pivotally connected, steel slats of conventional nature. Door guide and sealing members 2 and 3, further detailed hereinafter, are provided adjacent the respective sides of the door opening and are mounted for support on the respective wall angles 4 and 6. In the upper portion of the door structure, there is provided a box 7 for the reception of the upper edge of said door, here a roll-type door unit 8 of a material, as steel, which is opaque to at least longwave (heat generating) electromagnetic radiation. Mounted parallel with, spaced from, and adjacent, said roll-type steel door is a heat trapping, as a transparent plastics in one embodiment, panel 9 which is fixed at its lower edge to the lower edge of the door 8 and which at its upper edge is wrapped around a spring balanced drum 11. Said panel 9 is of any material which will be transparent to short-wave electromagnetic radiation such as the range of visible colors through the ultraviolet but opaque to longwave electromagnetic radiation such as heat generating radiation. Examples of appropriate materials are those of the conventional transparent flexible plastics such as vinyls and polyesters, one particular arrangement involving two sheets of a vinyl with a polyester scrim interposed between the vinyl sheets.

It has also been discovered quite unexpectedly that it is feasible to utilize a heat absorbtive, as black, curtain for the panel 9 and under such conditions the heat absorbed by the curtain 9 itself will be transferred to the metal door 8 and the same heat protective results obtained as with a transparent panel. Thus, while with a black curtain as the panel 9 the heat transfer mechanics are somewhat different than in the case where the rays can pass unobstructedly through said panel 9, the ultimate objective of providing a heat barrier against the escape of heat from within the building is accomplished. Because of this, in the hereinafter-following discussion the term "transparent panel" will be utilized to indicate a panel 9 made from material permitting the sun's rays to pass therethrough and the term "heat trapping panel" will be utilized to indicate a panel 9 made from either transparent or opaque material.

Turning now to other parts of the drawings for relevant details of construction, which are given primarily as examples of a specific embodiment of the invention but which, it will be understood and recognized, can be varied widely within the scope of the invention, the following may be offered.

Referring first to FIGS. 3 and 4, it will be understood that any conventional means for supporting in rolled condition the upper edge of the flexible steel curtain will be acceptable for carrying out the purposes of the invention. In said FIGS. 3 and 4, there is shown one specific means for so doing. However, inasmuch as this portion of the door here concerned is conventional, such disclosure is largely schematic and attention may be directed toward the published literature, such as U.S. Pat. No. 3,640,332, for details relevant thereto.

With respect to FIGS. 3 and 4, there is shown a pair of plates 12 and 13 projecting outwardly from the wall of the building above the door opening into which is rotatably received the roll 14 on which said flexible door is wrapped. Same rotates within bearings of which one is shown at 16 received into openings within such plates of which one is shown at 17 and such door is spring counterbalanced in any conventional manner. Such spring structure as explained more fully in said U.S. Pat. No. 3,640,332 is affixed at one end to the central rod 19 and at its other end to the rotatable drum 14 and sensed for tightening as the door is drawn downward into its closed position. Such spring thus in a known manner counterbalances at least a portion of the weight of the door and thereby eases the return of the door into its open position. All of this is conventional construction, well understood by those skilled in the art and no further detail thereof is believed essential.

Turning now to the portion of construction relating to the heat generating and/or trapping panel 9, there is shown somewhat schematically in FIG. 2 a header seal 21 for the curtain and same is shown in more detail in FIGS. 3 and 4. Same is of metal or plastic tube mounted in any convenient manner, such as by the angle member 22 (FIG. 3) within the box 7, here by being mounted onto the inside surface of the building immediately above the door opening. A curtain barrel 23 (FIG. 5) is mounted through bearings of which one is shown at 26 onto a fixed rod 27 which latter is mounted in any convenient manner, such as through brackets 28 onto angles 29 which are in turn mounted on the extending plates 12 and 13. The barrel 23 is preferably mounted with counterbalancing spring 20 in the same manner as above described in connection with the drum 14 of the roll-type steel door 8 in order constantly to urge the panel 9 in an upward direction. Thus, the roll 23 cooperates with the roll 14 in order that both the roll-type steel door 8 and the curtain 9 will move upwardly and become wrapped onto their respective rolls as the door is moved upwardly from its closed to its open position. Inasmuch as the construction of the roll 23 from the standpoint of its spring balancing means is of a conventional and already well-known type and generally similar to that already described in connection with the roll 14 as further illustrated in U.S. Pat. No. 3,604,332, further detailing thereof is unnecessary.

The lower edges of the roll-type steel door and the transparent curtain 9 are shown in FIG. 6, it being understood, of course, that this construction is only illustrative and may be varied widely as desired within the broader aspects of the invention. Here, a pair of angles 25 and 30 are placed in back-to-back relationship on either side of the lower edge of the roll-type steel door 8 and fixed in any convenient manner such as by volts or rivets, not shown, passing through the two facing flanges of the respective angles and the lower edge of the door 8 sandwiched therebetween. The heat trapping curtain 9 is folded back upon itself at its lower edge to provide a reentrant portion 31 wrapping around a reinforcing bar such as the steel bar 32 with the entirety thereof being placed closely against the upstanding flange 33 of angle member 34. Said angle member 34 is fixed as by a screw 36 to a flange of the angle 30 and the lower edge of the curtain 9 is fixed to the flange 33 as by a bolt 37 passing through said flange, the folded-back portions of the curtain and the bar 32. In the embodiment illustrated, there is also provided a stop angle 38 for limiting the upward movement of the door assembly at a desired open position.

A preferred side construction of the door is illustrated in FIG. 7 which again, while advantageous, is, at least insofar as the broader aspects of the door are concerned, primarily exemplary, and may be varied within the broader concept of the invention. Here there is shown an extrusion 41, such as from a substantially rigid vinyl or nylon, having a base section 42 arranged for face-to-face contact with an outwardly projecting flange 43 of the side angle member 4. Projecting from said base member 42 into the door opening is a pair of slightly flexible convergent flanges 44 and 46 between which the heat trapping curtain 9 is introduced. Said flanges 44 and 46 are preferably of such normal shape as to come closer to each other when said curtain is absent therefrom than the thickness of said curtain, whereby when said curtain is introduced therebetween they will be distorted sufficiently to bear against the opposite sides of said curtain with a slight pressure. In this manner, the sealing characteristics between the flanges 44 and 46 and the respective sides of the curtain 9 are enhanced.

Spaced inwardly of the building from the flanges 44 and 46 is a further flange 47 which is parallel to said flanges and carries at its outer edge an elongated sealing strip 48. Said strip 48 may be of any conventional material, such as a somewhat flexible nylon or a synthetic rubber. A main door guide 51 is also mounted on the angle member 4, in this case through the base 42 and positioned for receiving and guiding the edge of the main door 8. Here said guide 51 comprises a generally U-shaped structure having reentrant edges of which one is indicated at 52 and a slightly offset bight 53, the offset of which for alignment purposes is arranged to fit against the low ridge 54 provided in the base 42. Said guide 51 is fixed to the base 42 and flange 43 in any convenient manner, such as by bolts 56 (FIG. 4) passing from the bight 53 through the low ridge 54 and the base 42 into and through the flange 43, with the nuts then provided as desired on the ends thereof.

The construction at the opposite edge of said door and associated with the edge strip 3 is a mirror image of that shown in FIG. 7, will be sufficiently understood from that already described in connection with the edge strip 2 and illustrated in FIG. 7 and does not need to be further detailed.

The operation of the apparatus of the invention will be apparent to those skilled in the art but will now be reviewed further to insure complete understanding of the invention.

The main door 8 is wrapped around the spring counterbalanced roll 14 and may move from open to closed positions and vice versa in a conventional and already well-known manner. The heat generating panel 9 is spaced therefrom, held firmly with respect thereto by the bottom and side edge mountings above described and is wrapped around spring balanced roll 11, likewise also above described, by which same may move from open to closed position and vice versa in the same manner as that described in connection with the main door 8.

It will be recognized that the different thicknesses of the two panels, namely the steel door 8 and the plastic sheet 9, will require rotation of the respective rolls 11 and 14 at different rates of rotation for proper wind-up thereof. In the illustrated embodiment, and preferably, by having each of said rolls spring-balanced as above described and independent of each other, respective wind-up operations will proceed independently and properly at their respectively required speeds. However, if desired, it would also be possible to drive the more rapidly rotating (i.e. the smaller) of the rolls from any suitable source, normally a spring-balanced source as disclosed, and drive the other of said rolls by sprocket-and-chain means through a friction clutch.

When said door is in closed position light rays falling thereon will, in the case where the heat trapping curtain is transparent, pass therethrough and fall upon the main door 8. Such light rays will warm the material comprising the main door 8 in a manner already well understood and heat radiated therefrom will be trapped by the longwave-opaque sheet 9 in a manner already well known in connection with greenhouses and other similar devices. This will tend to heat the zone between the doors 8 and 9 and to induce a relatively high temperature, particularly where the rays falling upon the main door 8 are direct sunlight, whereby to strongly inhibit the escape of heat through said main door 8 from within the building. In the case where the curtain 9 is heat absorbtive, same will be heated by the sun's rays, will heat the main door 8 and similarly inhibit escape of heat from the building.

When it is desired to open said door, same may be accomplished in a normal manner merely by lifting said door and the rolls 11 and 14 will roll up the flexible doors respectively connected thereto in a conventional manner, both of said rolls acting simultaneously and enabling the opening of said door without special attention to the existence of the secondary sheet 9 associated with the main door 8. Likewise closing of said door may be accomplished merely by pulling said main door downwardly in a normal manner to closed position with both of the rolls 11 and 14 permitting unwrapping in a conventional manner of the respective door components associated therewith.

If it is desired during the summer to minimize the self-heating capacity of the door as above described, it is a simple matter to detach the lower edge of the heat trapping panel 9 from the angle 34, with the stop angle 38 being then attached directly to the flange 33 thereof, and permitting said panel 9 to move into its upper position out of the way after which the main door 8 may continue to function in a normal manner. Upon the return of cold weather, said panel 9 may then be reattached to the flange 33 in the manner above described for resumption of heat generating functions above described.

It has been found that the panel 9, when used in conjunction with the door 8, is capable of reducing air leakage through the door (hence the opening it closes) by as much as 80%.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A heat-protective door assembly for a door opening formed in a vertical wall of a building, comprising:
   a roll-type door formed from a plurality of horizontally arranged pivotally connected parallel metal slats which are opaque to at least longwave (heat generating) electromagnetic radiation;
   first drum means arranged above said door opening for receiving said roll-type door in coiled relationship therearound, said door being unrolled from said first drum means and movable downwardly for closing said opening;
   first channel-shaped side guide means positionable on the respective sides of said door opening for guiding the edges of said door therealong as said door is moved between open and closed positions;
   a flexible panel of material opaque to at least longwave (heat generating) electromagnetic radiation, said panel being co-extensive with, spaced from and substantially parallel to the exterior surface of that portion of said door as is in said door opening;
   second drum means mounted adjacent said first drum means for receiving said panel and rolling same therearound as said panel is moved out of said door opening;
   connecting means secured to the lower free edges of said door and said panel for fixedly connecting said lower edges together so that said door and panel move in unison when being opened or closed, said connecting means including spacer structure for maintaining said panel adjacent the lower edge thereof spaced outwardly a substantial distance from the exterior surface of said door;

second channel-shaped side guide means positionable on the respective sides of said door opening for guiding the side edges of said panel when the panel is positioned within said door opening, said second guide means being positioned adjacent but exterior of said first guide means and substantially parallel thereto;

said second guide means including means for slidably and sealingly engaging said panel adjacent the side edges thereof to maintain said edges spaced a substantial distance from the exterior surface of said door; and said second guide means and said connecting means creating a substantially closed air space between said panel and said door when the latter are in said closed position, whereby said air space defines a heat zone for inhibiting radiant heat loss through said door from within the building.

2. A door assembly according to claim 1, wherein said second channel-shaped guide means comprises a pair of flanges which resiliently bear against the opposite sides of said panel in the vicinity of the respective side edge.

3. The door assembly of claim 2, wherein said first guide means includes seal means associated therewith for effecting an air seal between said door and said first guide means, and horizontally elongated sealing means stationarily mounted adjacent the upper edge of said opening and engaged with the exterior surface of said panel.

4. The door assembly of claim 1, wherein at least one of said drum means is resiliently counterbalanced.

5. The door assembly of claim 1, including an angle member mountable to a wall of the building adjacent the door opening and a mounting member having a base portion and a mounting zone for receiving said first guide means, the second guide means having flanges integral with and extending from said base portion, a third flange integral with and extending from said base portion adjacent said mounting zone and a sealing member at the free edge thereof for bearing against said door when same is within said first guide means.

6. The door assembly of claim 1, wherein said panel comprises a plastics material transparent to visible electromagnetic radiation but opaque to heat generating electromagnetic radiation.

7. The door assembly of claim 1, including means independently urging rotation of said first and second drum means in wind-up directions.

* * * * *